United States Patent
Jeong et al.

(10) Patent No.: US 9,491,695 B2
(45) Date of Patent: Nov. 8, 2016

(54) DEVICE AND METHOD FOR SELECTING A CELL ACCORDING TO A SPEED OF A TERMINAL IN A MOBILE COMMUNICATION NETWORK

(75) Inventors: Kyeong In Jeong, Gyeonggi-do (KR); Soeng Hun Kim, Gyeonggi-do (KR); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 293 days.

(21) Appl. No.: 14/238,316

(22) PCT Filed: Aug. 13, 2012

(86) PCT No.: PCT/KR2012/006457
§ 371 (c)(1),
(2), (4) Date: Feb. 11, 2014

(87) PCT Pub. No.: WO2013/025034
PCT Pub. Date: Feb. 21, 2013

(65) Prior Publication Data
US 2014/0194117 A1    Jul. 10, 2014

(30) Foreign Application Priority Data
Aug. 12, 2011    (KR) ........................ 10-2011-0080866

(51) Int. Cl.
*H04W 36/32*    (2009.01)
*H04W 48/04*    (2009.01)
(Continued)

(52) U.S. Cl.
CPC ............. *H04W 48/20* (2013.01); *H04W 36/32* (2013.01); *H04W 52/0254* (2013.01); *H04W 36/04* (2013.01); *H04W 36/36* (2013.01); *H04W 48/04* (2013.01)

(58) Field of Classification Search
CPC ... H04W 48/20; H04W 36/34; H04W 36/36; H04W 48/04
See application file for complete search history.

(56) References Cited

U.S. PATENT DOCUMENTS

| 2010/0008323 | A1* | 1/2010 | Deshpande | ........... H04W 48/12 370/331 |
| 2013/0083744 | A1* | 4/2013 | Peng | ..................... H04W 52/04 370/329 |
| 2013/0188543 | A1* | 7/2013 | Dwyer | ................ H04W 76/046 370/311 |

FOREIGN PATENT DOCUMENTS

| EP | 2 293 606 | 3/2011 |
| EP | 2 337 396 | 6/2011 |

(Continued)

OTHER PUBLICATIONS

European Search Report dated Apr. 9, 2015 issued in counterpart application No. 12823297.2-1854.
(Continued)

*Primary Examiner* — Asghar Bilgrami
(74) *Attorney, Agent, or Firm* — The Farrell Law Firm, P.C.

(57) ABSTRACT

The present invention defines an efficient method for (re) selecting a cell according to a speed of a terminal in a HetNet where cells having various regions such as macro cells, pico cells and femto cells are arranged in the same frequency band in a mobile communication system. A cell selection control method of a terminal in a mobile communication system, according to an embodiment of the present invention, comprises a step of receiving, from a base station, cell list information for not allowing a terminal moving at a high speed to select a cell and a step of setting the terminal so that cells included in the cell list information are considered or not considered to be targets of selection or reselection when the terminal moves at the high speed. According to the present invention, in a network consisting of various types of cells using the same frequency band, the terminal can determine whether to select or reselect a cell according to the speed of the terminal. That is, the terminal moving at the high speed does not select or reselect a frequent service cell, thereby efficiently performing the cell selection or reselection. Further, power consumption of the terminal can be reduced.

13 Claims, 5 Drawing Sheets

(51) Int. Cl.
*H04W 48/20* (2009.01)
*H04W 52/02* (2009.01)
*H04W 36/36* (2009.01)
*H04W 36/04* (2009.01)

(56) References Cited

FOREIGN PATENT DOCUMENTS

| JP | 2009201072 | 9/2009 |
|---|---|---|
| KR | 1020100064833 | 6/2010 |
| KR | 1020110061140 | 6/2011 |
| KR | 1020110067827 | 6/2011 |

OTHER PUBLICATIONS

PCT/ISA/237 Written Opinion issued on PCT/KR2012/006457 (pp. 5).
PCT/ISA/210 Search Report issued on PCT/KR2012/006457 (pp. 3).

\* cited by examiner

DEVICE AND METHOD FOR SELECTING A CELL ACCORDING TO A SPEED OF A TERMINAL IN A MOBILE COMMUNICATION NETWORK

TECHNICAL FIELD

The present invention relates to a cell selection apparatus and method for use in a mobile communication system and, in particular, to an apparatus and method for (re)selecting a cell based on the mobility of a terminal.

BACKGROUND ART

The mobile communication system has been developed for the user to communicate on the move. With the rapid advance of technologies, the mobile communication system has evolved to the level capable of providing high speed data communication service as well as voice telephony service. Recently, as one of the next generation mobile communication system, Long Term Evolution (LTE)/LTE-Advanced (LTE-A) is on the standardization by the $3^{rd}$ Generation Partnership Project (3GPP). LTE is a technology designed to provide high speed packet-based communication of up to 100 Mbps and aims at commercial deployment around 2010/2011. LTE-A has been evolved from LTE to improve data with the adoption of various novel technologies.

In the case of such a mobile communication system, a network may be implemented with a plurality of cells using the same frequency but various in size. For example, a plurality of macro, pico, and femto cells operating on the same frequency band may coexist. The macro, pico, and femto cells may be differentiated by size: a macro cell is the cell large relatively in size and pico and femto cells are (very) small relatively in size.

In the case that a network is configured as above, the terminal may access a macro, pico, or femto cell. If the radio channel measured by the terminal fulfils a cell (re)selection condition, it performs cell (re)selection process. At this time, a high speed terminal (high-mobility User Equipment (UE)) may attempt cell (re)selection operation frequently. That is, in the case that the high-mobility UE (re)selects the pico or femto cell, it is likely to repeat cell (re)selection immediately due to the high mobility, resulting in inefficient power consumption of UE.

DISCLOSURE OF INVENTION

Technical Problem

The present invention defines a method for (re)selecting cell efficiently depending on the mobility of the UE in a network include a plurality of cells operating on the same frequency and classified into macro, pico, and femto cells by size.

For this purpose, in the present invention, a base station includes a cell list and indicators indicating selected cells in the system information broadcast within a cell. When the system information is received, the UE of the present invention analyzes its mobility and cell selection indicator such that the high mobility UE rules out the cells included in the cell list for cell (re)selection.

Solution to Problem

In accordance with an aspect of the present invention, a cell selection control method of a terminal in a mobile communication system includes receiving a cell list for the terminal in a high mobility to skip selecting a cell from a base station and configuring, when the terminal is in the high mobility, the terminal to do one of regarding cells listed in the cell list as cell (re)selection candidates and ruling out the cells listed in the cell list from the cell (re)selection candidates. Preferably, the receiving of the cell list includes receiving a cell selection indicator indicating whether to perform the configuring of the terminal, and the configuring of the terminal comprises configuring, when the terminal is in the high mobility and the cell selection indicator indicates to perform the configuration, the terminal to do one of regarding cells listed in the cell list as cell (re)selection candidates and ruling out the cells listed in the cell list from the cell (re)selection candidates.

Preferably, the cell selection indicator is a 1-bit indicator, the cell selection indicator is a bitmap indicating a type of mobility of the terminal, and bitmap instances correspond to respective mobility levels.

Preferably, the cell list comprises Physical Cell Identifiers (PCIs), and the cell list and the cell selection identifier are received in system information.

In accordance with another aspect of the present invention, a cell selection control method of a base station in a mobile communication system includes generating a cell list configuring, when a terminal is in the high mobility, the terminal to do one of regarding cells listed in the cell list as cell (re)selection candidates and ruling out the cells listed in the cell list from the cell (re)selection candidates and transmitting the cell list to the terminal.

Terminal

In accordance with another aspect of the present invention, a cell selection control apparatus of a terminal in a mobile communication system includes a transceiver which receives data and a control signal from a base station, an RRC message generation/interpretation unit which interprets cell list in the received control signal, a mobility management unit which manages mobility of the terminal, and a cell selection unit which configures, when the terminal is in the high mobility, the terminal to do one of regarding cells listed in the cell list as cell (re)selection candidates and ruling out the cells listed in the cell list from the cell (re)selection candidates.

In accordance with still another embodiment of the present invention, a cell selection control apparatus of a base station in a mobile communication system includes a transceiver which transmits data and a control signal to a terminal, an RRC message generation/interpretation unit which generates a cell list configuring, when a terminal is in the high mobility, the terminal to do one of regarding cells listed in the cell list as cell (re)selection candidates and ruling out the cells listed in the cell list from the cell (re)selection candidates, and a control unit which controls transmitting the cell list to the terminal.

Advantageous Effects of Invention

The mobility-based cell (re)selection apparatus and method of the present invention is capable of determining to perform cell (re)selection according to the mobility of the UE in the network including a plurality of cells operating on the same frequency band and different is size. The mobility-based cell (re)selection apparatus and method of the present invention is capable of preventing the high-mobility UE from performing frequency cell (re)selection unnecessarily, thereby improving cell (re)selection efficiency and reducing power consumption of the UE.

MODE FOR THE INVENTION

Figure 1:
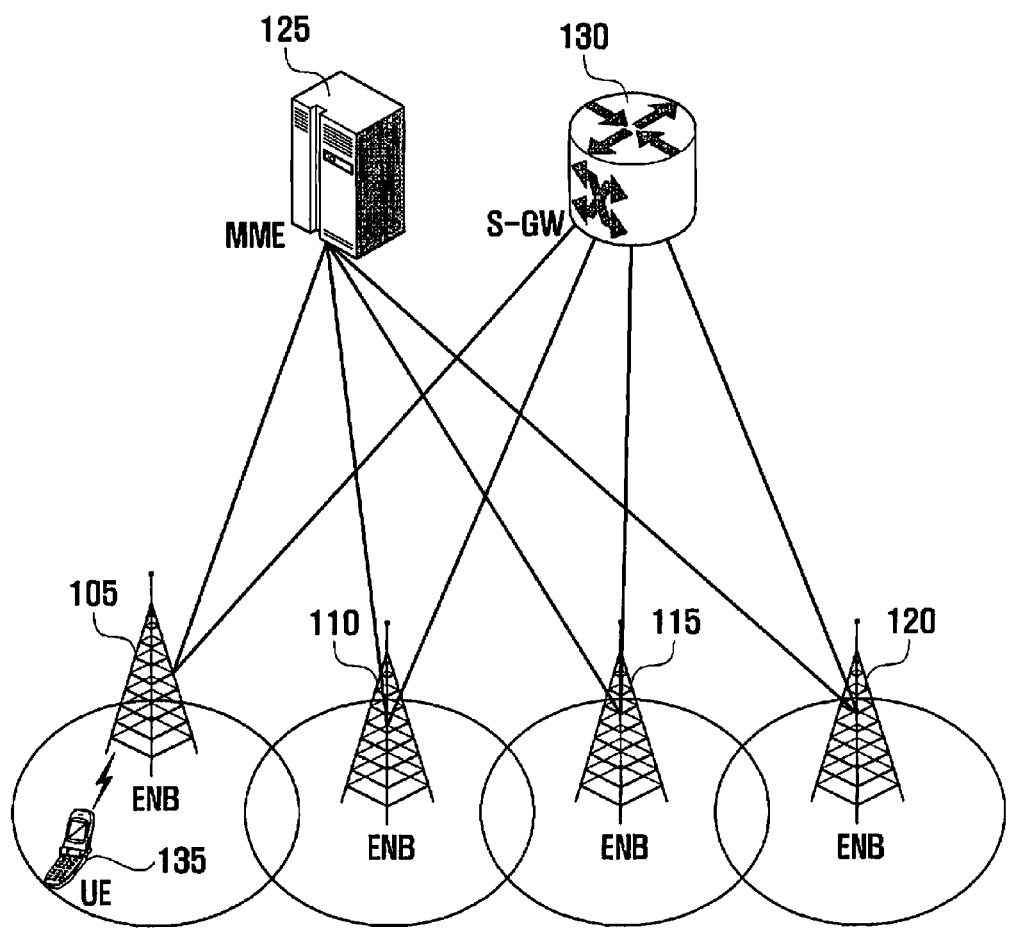
FIG. 1 is a diagram illustrating architecture of a 3GPP LTE mobile communication system.

Exemplary embodiments of the present invention are described with reference to the accompanying drawings in detail. The same reference numbers are used throughout the drawings to refer to the same or like parts. FIG. 1 is a diagram illustrating architecture of a LTE mobile communication system.

Referring to FIG. 1, a radio access network of the LTE mobile communication system includes evolved Node Bs (eNBs) 105, 110, 115, and 120, a Mobility Management Entity (MME) 125, and a Serving-Gateway (S-GW) 130.

The User Equipment (hereinafter, referred to as UE) 135 connects to an external network via eNBs 105, 110, 115, and 120 and the S-GW 130. The UE 135 connects to the eNBs 105, 110, 115, and 120 through radio channels. The eNBs 105, 110, 115, and 120 corresponds to the legacy node Bs of the UMTS system. The eNB is responsible for collecting status information of the UEs for scheduling and controlling radio resource for a plurality of cell under the control of the eNB. In order to accomplish the data rate of up to 100 Mbps, the LTE system adopts Orthogonal Frequency Division Multiplexing (OFDM) as a radio access technology on up to 20 MHz bandwidth. Also, the LTE system adopts Adaptive Modulation and Coding (AMC) to determine the modulation scheme and channel coding rate in adaptation to the channel condition of the UE. MME 125 is responsible for various control functions and connected to a plurality of eNBs 105, 110, 115, and 120. The S-GW 130 is an entity to provide data bearers so as to establish and release data bearers under the control of the MME 125.

Figure 2:
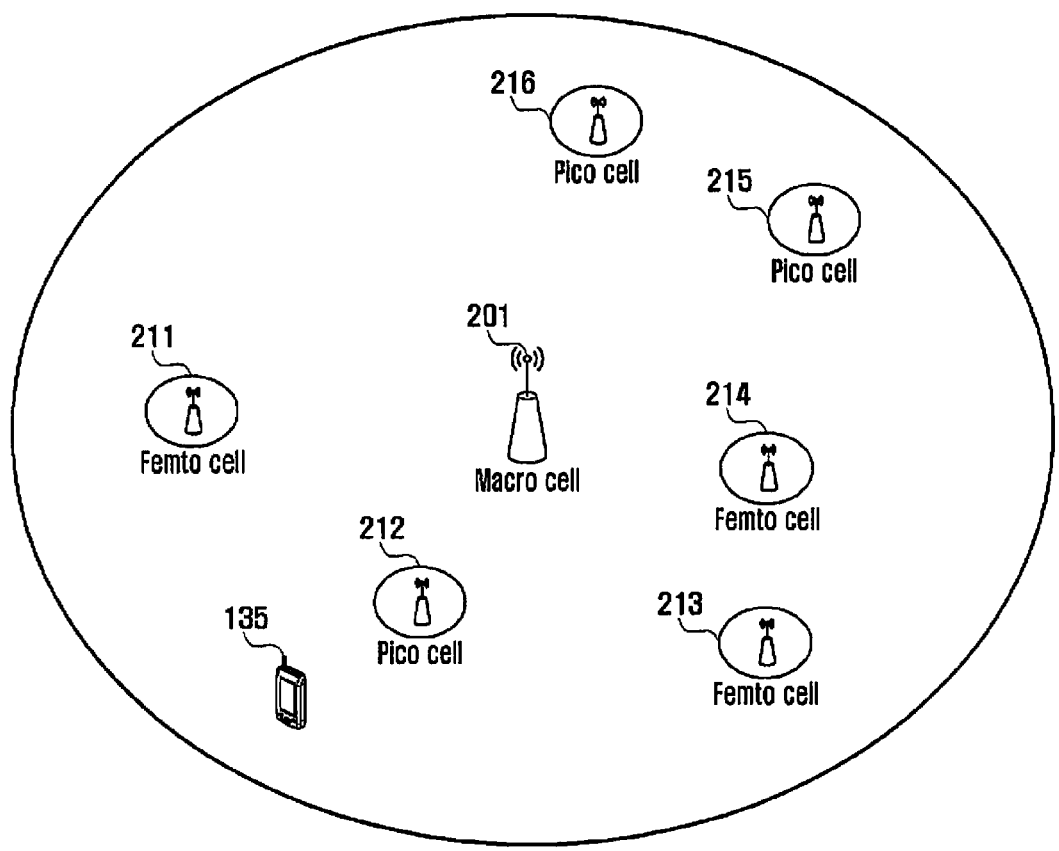
FIG. 2 is a diagram illustrating a HetNet including various types of cells operating on the same frequency.

FIG. 2 is a diagram illustrating a network including cells operating on the same frequency and different in size and accessibility characteristics.

Referring to FIG. 2, in the case of an LTE communication system, the macro cell 101, the pico cells 112, 115, and 116, and the femto cells 111, 113, and 114 may be deployed to operate on the same frequency band. Here, the macro cell 101, the pico cells 112, 115, and 116, and the femto cells 111, 113, and 114 may be classified by cell size (i.e. service coverage of cell). That is, the macro cell 101 represents the cell relatively large in size, and the pico cells 112, 115, and 116 and the femto cells 111, 113, and 116 represent the cells relatively (very) small in size. Also, the pico cells 112, 115, and 116 and the femto cells 111, 113, and 114 may be classified by accessibility. That is, the pico cells are the cells that normal UEs may access, and the femto cells are the cells that predetermined UEs subscribed to the femto cells may access. The network structure in which a plurality of cells operating on the same frequency band and different in size and accessibility coexist is referred to as Heterogeneous Network (HetNet).

At this time, the UE 135 is the UE capable of accessing all of the macro cell 201, pico cells 212, 215, and 216, and femto cells 211, 213, and 214 and moving at high speed (high mobility UE). In this case, the terminal 121 measures the radio channel on the move and, if the radio channel measurement result fulfills the cell (re)selection condition, performs cell (re)selection. However, if the UE 135 performs cell (re)selection among the pico cell 212, 215, and 216 or the femto cells 211, 213, and 214, cell (re)selection may occur frequently due to the high mobility of the UE 135. In this case, the frequent cell (re)selection of the UE 135 is inefficient in view of power consumption.

In an embodiment of the present invention, the eNBs 105, 110, 115, and 120 broadcast the system information including a cell list and an indicator indicating whether a certain cells is selected or not (hereinafter, referred to as cell selection indicator) in order to prevent unnecessarily frequent cell (re)selection of the UE. Here, the eNBs 105, 110, 115, and 120 may correspond to the macro cell 201 of FIG. 2. The cell list is a list of cell identifiers, and the cell identifier may be Physical cell ID (PCI). The PCI may be a unique integer value assigned to one physical within a certain area. The cell selection identifier may be the information for use in preventing cell re(selection) to the cells included in the cell list. Here, the cell selection indicator may consists of 1 bit and, in this case, set to true (e.g. 1) or false (e.g. 0). The cell selection indicator may be a 1-bit flag and, in this case, set to on (e.g. 1) or off (e.g. 0). If the cell list and cell selection indicators are received, the UE 135 determines whether to perform cell (re)selection according to its mobility. That is, the high-mobility UE 135 does not perform cell (re)selection to the cells of which cell selection indicators are included in the cell list.

In the following description, the term 'cell selection' is used in the meaning of including both cell selection and reselection.

Figure 3:
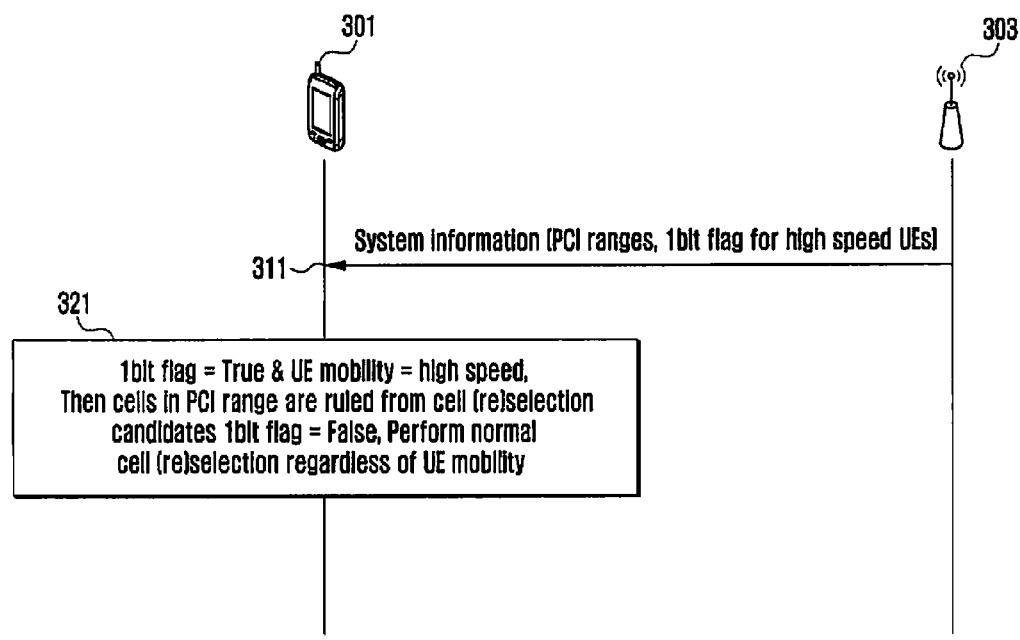
FIG. 3 is a signal flow diagram illustrating signal flows between an eNB and a UE for explaining cell selection procedure in a HetNet according to an embodiment of the present invention.

FIG. 3 is a signal flow diagram illustrating signal flows between an eNB and a UE for explaining cell selection procedure in a HetNet according to an embodiment of the present invention.

In FIG. 3, reference number 301 denotes a UE and reference number 303 denotes an eNB controlling a cell as an exemplary network node 303. Although the description is directed to an exemplary case where the UE is in idle mode, the present invention is not limited there to but applicable to the UEs in other operation modes. The other operation modes include the connected mode. The idle mode denotes the state in which the UE is not connected to the eNB controlling the cell and the eNB has no UE context. The connected mode denotes the state in which the UE is connected to the eNB controlling the cell and the eNB has the UE context. The UE in the idle mode performs cell (re)selection when it roams across cells, and the UE in the connected mode performs handover when it roams across cells. In 3GPP LTE, the cell reselection is specified in TS36.304, and the handover is specified in TS36.331.

The eNB broadcasts the system information including a cell list and cell selection indicator/flag within the cell at step 311. Here, the cell list is the list of the cell identifiers, and the cell identifier may be the Physical Cell Identifier (PCI). The PCI is a unique integer value assigned to one cell within certain area. The cell selection indicator/flag indicates the cells to which the high mobility UE skips cell (re)selection to the cells included in the cell list. The cell selection indicator/flag may consist of 1 bit. The cell selection indicator also may be replaced by the information on whether the PCI list is included. That is, if the system information includes the PCI list but not the cell selection indicator/flag, this may be interpreted as the cell selection indicator/flag set to TRUE/ON; and otherwise, if the system information includes no PCI list, this may be interpreted as the cell selection indicator/flag set to FALSE/OFF.

If the system information transmitted by the eNB is received at step 311, the UE analyzes its mobility and the system information to determine whether to perform cell selection at step 321. At this time, if the cell selection indicator/flag is set to TRUE/ON (i.e. indicates UE operation in order for the high-mobility UE to skip cell reselection to the cells included in a specific cell list) and if the UE is the high-mobility UE, the UE rules out the cells included in the cell list for the cell reselection. If the cell selection indicator/flag is set to FALSE/OFF, the UE performs cell selection regardless of its mobility at step 321. The cell selection indicator/flag may be interpreted inversely.

Although the description is directed to the case where the cell selection indicator/flag is 1 bit, it may be implemented in the form of a bitmap composed of a plurality of bits. In the case of using the bitmap, In the case of using a bitmap, it is possible to classify the UE states into a plurality of mobility states indicate whether to perform cell selection according to the mobility state. For example, the 3GPP TS36.304 specifies three mobility states: high-mobility state, medium-mobility state, and normal-mobility state. In this case, the cell selection indicator is implemented in the form of a 3-bit bitmap (or 2-bit bitmap) to indicate TRUE/ON or FALSE/OFF depending on the mobility. Accordingly, the UE in the mobility state mapped to the TRUE/ON rules out the cells included in the PCI list from the cell reselection candidates, and the UE in the mobility state mapped to the FALSE/OFF performs the cell reselection as usual. For example, if the 3-bit bitmap is set to '100', the high mobility UE rules out the cells included in the PCI list from the cell reselection candidates, and the medium-mobility and normal-mobility UEs performs cell reselection as usual. If the 3-bit bitmap is set to '110', the high-mobility and medium-mobility UEs rule out the cells included in the PCI list from the cell reselection candidates, and the normal-mobility UE performs cell reselection as usual. The TRUE/ON and FALSE/OFF values of the cell selection indicator/flag may be interpreted differently.

In an embodiment of the present invention, the PCI lists for the respective UE mobility states (high-mobility, medium-mobility, and normal-mobility) may be signaled through the system information. Assuming that a set of 3 PCI lists, the PCI list set may be configured in such a way that the first PCI list notifies the high-mobility UE of the cells ruled out from the cell reselection candidates, the second PCI list notifies the medium-mobility UE of the cells ruled out from the cell reselection candidates, and the third PCI list notifies the normal-mobility UE of the cells ruled out from the cell reselection candidates. In this case, the UE references the corresponding PCI list depending on its mobility state to determine the cells to be ruled out from the cell reselection candidates.

Although FIG. 3 is directed to the case where the cells included in the signaled PCI list are the cells ruled out for the cell reselection of the UE in the corresponding mobility state, it is also possible to define that the cells included in the PCI list are regarded as the cell reselection candidates of the UE in the corresponding mobility state in an alternative embodiment. That is, the high-mobility UE may determine the cell lists with the cell selection indicator set to true/on as the cell selection list.

Figure 4:
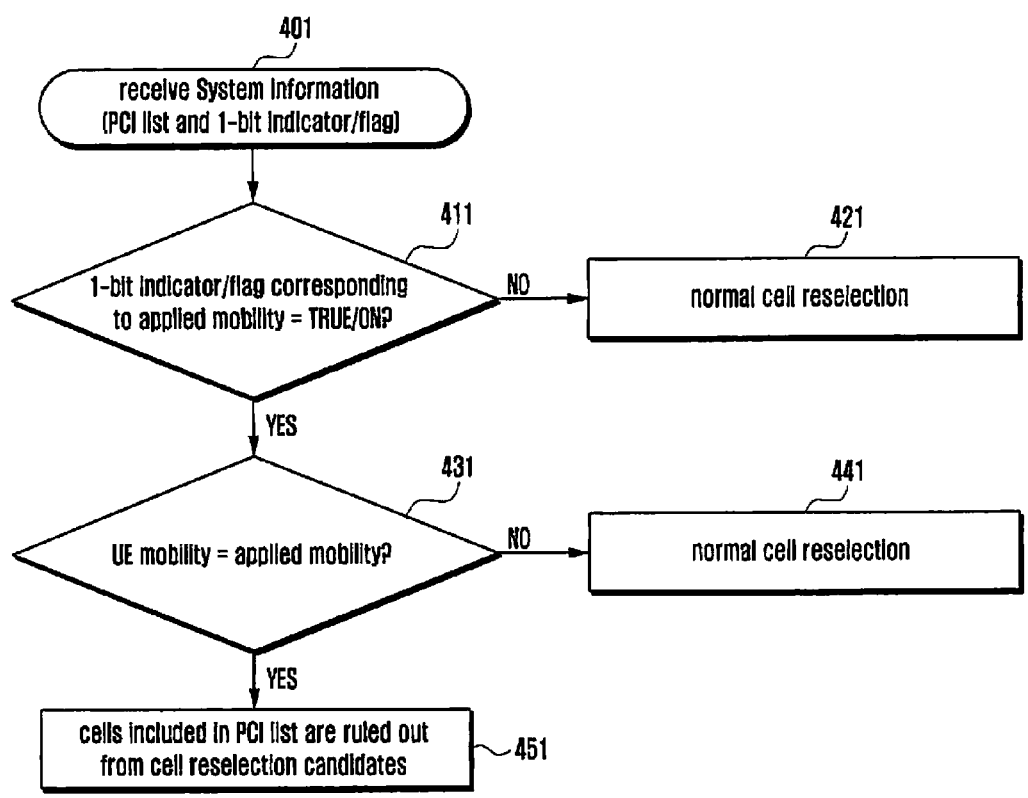
FIG. 4 is a flowchart illustrating a cell selection determination procedure of the UE in the embodiment of FIG. 3.

FIG. 4 is a flowchart illustrating a cell selection determination procedure of the UE in the embodiment of FIG. 3. FIG. 4 is a drawing illustrating the UE operation procedure in an exemplary case where the cell list and 1-bit cell selection indicator/flag are used.

Referring to FIG. 4, the UE acquires the PCI list and cell selection indicator/flag from the system information broadcast by the eNB within the cell at step 401. Next, the UE analyzes the received cell selection indicator/flag at step 411. If the cell selection indicator/flag is set to a value other than TRUE/ON (i.e. set to FALSE/OFF), the UE detects this at step 411 and performs the normal cell (re)selection regardless of the UE mobility at operation 421.

If the cell selection indicator/flag is set to TRUE/ON, the UE checks its mobility and determines whether its mobility matches the mobility applied to skip cell reselection at operation 431. That is, the UE determines whether the UE mobility is the high-mobility at operation 431 and, if not, performs the normal cell (re)selection) at operation 441.

Otherwise if the UE mobility matches the applied mobility (i.e. if the UE mobility is the high mobility), the UE rules out the cells included in the PCI list from the cell selection candidates at operation 451. That is, if the UE mobility matches the applied mobility at operation 431 and if the cell selection indicator/flag indicates the high mobility, this means ruling out the cells included in the cell list from the cell reselection candidates and thus the UE rules out the cells included in the cells list for reselection candidates at operation 451.

Although FIG. 4 is directed to the case where the UE analyzes the cell selection indicator information and then the mobility state of the UE, the UE may analyze its mobility first and then the cell selection indicator.

As described above, if the 1-bit cell selection indicator/flag indicating the mobility to be applied is set to TRUE/ON and if the UE mobility matches the applied mobility, the cells listed in the PCI list are ruled out from the cells reselection candidates. For example, assuming that the 1-bit indicator/flag is of the high mobility, if the 1-bit indicator/flag received in the system information is set to TRUE/ON and if the UE mobility is the high mobility, the UE rules out the cells listed in the PCI list from the cell reselection candidates. However, although the 1-bit indicator/flag is set to TRUE/ON, if the UE mobility mismatches the applied mobility, the UE performs cell reselection as usual. As described above, the 1-bit indicator/flag (TRUE/ON and FALSE/OFF) may be interpreted inversely.

Although FIG. 4 is directed to the case where the cell selection indicator/flag is configured with 1 bit, the 1-bit indicator/flag may be replaced by a bitmap composed of a plurality of bits. In the case of using a bitmap, it is possible to classify the UE states into a plurality of mobility states indicate whether to perform cell selection according to the mobility state. For example, the 3GPP TS36.304 specifies three mobility states: high-mobility state, medium-mobility state, and normal-mobility state and, in this case, it is possible to signal TRUE/ON or FALSE/OFF value for each mobility state using the 3-bit bitmap and the UE in the mobility state mapped to the TRUE/ON value rules out the cells included in the PCI list from the cell reselection candidates while the UE in the mobility state mapped to the FALSE/OFF value perform cell reselection as usual. For example, if the 3-bit bitmap is set to '110', the high-mobility and medium-mobility UEs rule out the cells listed in the PCI list from the cell reselection candidates, and the normal-mobility UE performs cell reselection as usual. The TRUE/ON and FALSE/OFF values may be interpreted inversely.

Although FIG. 4 is directed to the case of using the cell selection indicator/flag information, the PCI list may be signaled according to each mobility state. For example, assuming that a set of three PCI lists is signaled, the first PCI list indicates the cells to be ruled out for cell reselection of the high-mobility UE, the second PCI list indicates the cells to be ruled out for cell reselection of the medium-mobility UE, and the third PCI list indicates the cells to be ruled out for cell reselection of the normal-mobility UE. The UE references the PCI list corresponding to its mobility state to rule out the cells included in the corresponding PC list from the cell reselection candidates.

Although FIG. 4 is directed to the case where the cells included in the signaled PCI list are ruled out from the cell reselection candidates, the present invention may be embodied in such a way that only the cells included in the PCI list are regarded as cell reselection candidates of the UE in the corresponding mobility state in an alternative embodiment.

Figure 5:
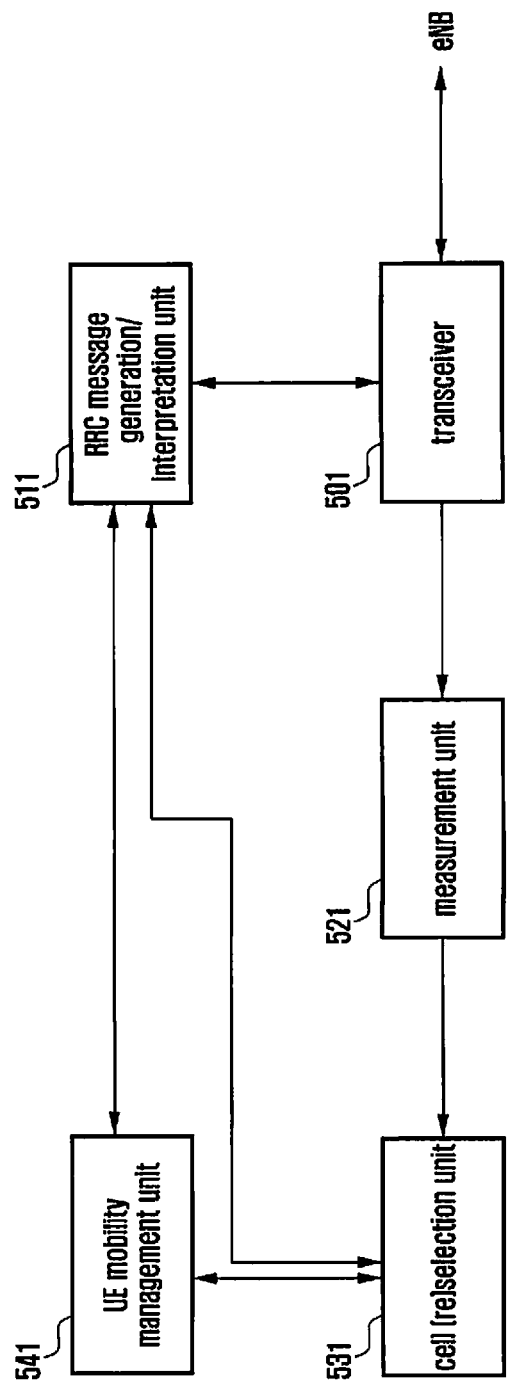
FIG. 5 is a diagram illustrating a configuration the UE of FIG. 3.

FIG. 5 is a block diagram illustrating a configuration of the UE determining whether perform cell selection depending on its mobility in a HetNet according to an embodiment of the present invention.

Referring to FIG. 5, the transceiver 501 transmits and receives control signals and data to and from the eNB. Here, the control signal received from the eNB include system information which contains the cell list and cell selection indicator for the UE to determine whether to perform cell selection or the cell list of the cells to be ruled out (or the cell list of the cells to perform cell selection, in this case, cell selection indicator may be omitted). The Radio Resource Control (RRC) message generation/interpretation unit 511 interprets the received system information message or UE-specific message. The measurement unit 521 measures the radio signal strength of the cell using a part of the control signal received by the transceiver 501. The mobility management unit 541 manages measures and manages the UE mobility.

The cell selection unit 531 performs cell reselection based on the radio signal strength measurement result of the cell measured by the measurement unit 521, the reception information interpreted by the RRC message generation/interpretation unit 511, and the current UE mobility information provided by the mobility management unit 541. That is, the UE measures the radio channel on the move and, if the radio channel measurement result fulfills the cell (re)selection) condition, performs cell (re)selection. If the measurement result from the measurement unit 521 fulfils the cell (re) selection condition, the cell selection unit 531 analyses the cell selection indicator included in the system information and the current UE mobility from the mobility management unit 541.

If the cell selection indicator is set to a value for restricting cell selection (e.g. TRUE/ON) and if the UE mobility matches the applied mobility (high-mobility), the cell selection unit 531 rules out the cells listed in the PCI list which is interpreted by the RRC message generation/interpretation unit 511 from the cell reselection candidates. Otherwise if the cell selection indicator is set to a value for non-restricting cell selection (e.g. FALSE/OFF), the cell selection unit 531 performs cell reselection as usual even when the UE is in high-mobility state. Also, if the UE is not in the high-mobility state even when the cell selection indicator is set to a value for restricting cell selection (e.g. TRUE/ON), the cell selection unit 531 performs cell selection as usual.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for cell selection by a terminal in a wireless communication system, the method comprising:
receiving a cell list including an identifier of at least one cell, and a cell selection indicator associated with the cell list from a base station;
determining whether the cell selection indicator is set to on;
if the cell selection indicator is set to off, configuring a cell selection candidate regardless of mobility of the terminal and the cell list; and
if the cell selection indicator is set to on and the terminal is in a high mobility, configuring the cell selection candidate with cells included in the cell list ruled out.

2. The method of claim 1, wherein the cell selection indicator is a 1-bit indicator.

3. The method of claim 1, wherein the cell selection indicator is a bitmap indicating a type of mobility level of the terminal.

4. The method of claim 1, wherein the identifier is a physical cell identifiers (PCI).

5. The method of claim 1, wherein the cell list and the cell selection indicator are received in system information.

6. A method for cell selection by a base station in a wireless communication system, the method comprising:
generating a cell list including an identifier of at least one cell, and a cell selection indicator associated with the cell list; and
transmitting the cell list and the cell selection indicator to a terminal,
wherein a cell selection candidate is configured by the terminal regardless of mobility of the terminal and the cell list, if the indicator is set to off, and
wherein the cell selection candidate is configured by the terminal with the at least one cell included in the cell list ruled out, if the cell selection indicator is set to on and the terminal is in a high mobility.

7. The method of claim 6, wherein the identifier is a physical cell identifiers (PCI).

8. A terminal for cell selection in a wireless communication system, the terminal comprising:
a transceiver configured to transmit and receive a signal; and
a controller configured to:
receive a cell list including an identifier of at least one cell, and a cell selection indicator associated with the cell list from a base station,
determine whether the cell selection indicator is set to on,
if the cell selection indicator is set to off, configure a cell selection candidate regardless of mobility of the terminal and the cell list, and
if the cell selection indicator is set to on and the terminal is in a high mobility, configure the cell selection candidate with cells included in cell list ruled out.

9. The terminal of claim 8, wherein the identifier is a physical cell identifiers (PCI).

10. A base station for cell selection in a wireless communication system, the base station comprising:
a transceiver configured to transmit and receive a signal; and
a controller configured to:
generate a cell list including an identifier of at least one cell, and a cell selection indicator associated with the cell list, and
transmit the cell list and the cell selection indicator to a terminal,
wherein a cell selection candidate is configured by the terminal regardless of mobility of the terminal and the cell list, if the indicator is set to off, and
wherein the cell selection candidate is configured by the terminal with the at least one cell included in the cell list ruled out, if the indicator is set to on and the terminal is in a high mobility.

11. The method of claim 6, wherein the cell selection indicator is a bitmap indicating a type of mobility level of the terminal.

12. The terminal of claim 8, wherein the cell selection indicator is a bitmap indicating a type of mobility level of the terminal.

13. The base station of claim 10, wherein the cell selection indicator is a bitmap indicating a type of mobility level of the terminal.

* * * * *